(12) United States Patent
Xu

(10) Patent No.: US 7,787,362 B2
(45) Date of Patent: Aug. 31, 2010

(54) METHOD AND DEVICE FOR RECOVERING A SHARED MESH NETWORK

(75) Inventor: Yongliang Xu, Shenzhen (CH)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 12/019,025

(22) Filed: Jan. 24, 2008

(65) Prior Publication Data

US 2008/0117806 A1 May 22, 2008

Related U.S. Application Data

(63) Continuation of application No. PCT/CN2006/003503, filed on Dec. 20, 2006.

(30) Foreign Application Priority Data

Dec. 22, 2005 (CH) ........................ 2005 1 0132201

(51) Int. Cl.
*H04J 1/16* (2006.01)
(52) U.S. Cl. ...................... 370/217; 370/227
(58) Field of Classification Search ......... 370/216–228; 398/1, 2, 5
See application file for complete search history.

(56) References Cited

U.S. PATENT DOCUMENTS

| 6,882,765 | B1 * | 4/2005 | Erickson et al. ............... 385/16 |
| 2002/0114031 | A1 | 8/2002 | Yamada | |
| 2002/0172149 | A1 * | 11/2002 | Kinoshita et al. ........... 370/216 |
| 2003/0152024 | A1 * | 8/2003 | Yang et al. .................. 370/216 |
| 2004/0162113 | A1 * | 8/2004 | Oomoto et al. ............. 455/560 |
| 2006/0203720 | A1 * | 9/2006 | Kano ......................... 370/228 |

FOREIGN PATENT DOCUMENTS

CN 1392686 A 1/2003

(Continued)

OTHER PUBLICATIONS

Kano et al., "Fast Recovery Mechanism in Optical Networks," $6^{th}$ *Asia-Pacific Symposium on Yangon, Myanmar*, 435-440 (Nov. 25, 2003).

(Continued)

*Primary Examiner*—Kwang B Yao
*Assistant Examiner*—Obaidul Huq
(74) *Attorney, Agent, or Firm*—Leydig, Voit & Mayer, Ltd.

(57) ABSTRACT

One embodiment of the present invention discloses a method and device for recovering a shared mesh network. The core idea of the method lies in that: a network ingress node of network connection service determines and saves routing information of a recovery path; after a working path is established successfully, a network management system controls resource reservation of the recovery path; and after the working path is interrupted, the network ingress node of the network connection service initiates an establishing procedure of the recovery path by using the reserved resources according to the saved routing information of the recovery path, and switches services on the working path to the recovery path for transmission. The technical solutions of the invention are easy to implement, and can be realized by using existing protocols; moreover, it can be well compatible with existing devices.

13 Claims, 2 Drawing Sheets

FOREIGN PATENT DOCUMENTS

| | | |
|---|---|---|
| CN | 1556637 A | 12/2004 |
| EP | 1 737 145 A1 | 12/2006 |

OTHER PUBLICATIONS

Kano et al., "Shared Segment Recovery Mechanism in Optical Networks," *Information and Telecommunication Technologies*, 1-6 (Nov. 9, 2005).

Lang et al., "RSVP-TE Extensions in Support of End-to-End Generalized Multi-Protocol Label Switching (GMPLS)-based Recovery," *CCAMP Working Group Internet Draft*, 1-39 (Apr. 2005) http://tools.ietf.org/html/draft-ietf-ccamp-gmpls-recovery-e2e-signaling -03>.

Konishi et al., "Joint Engineering Team (JET) Guidelines for Internationalized Domain Name, (IDN) Registration and Administration for Chinese, Japanese and Korean," *International Engineering Task Force (IETF)*, Network Working Group, Request for Comments 3743: 1-33 (Apr. 2004) http://www.ietf.org/rfc/rfc3743.txt.

State Intellectual Property Office of the People's Republic of China, Written Opinion of the International Searching Authority in International Patent Application No. PCT/CN2006/003503 (Apr. 19, 2007).

State Intellectual Property Office of the People's Republic of China, First Examination Report in Chinese Patent Application No. 200510132201.8 (Sep. 18, 2009).

European Patent Office, Examination Report in European Patent Application No. 06828409.0 (Mar. 13, 2009).

* cited by examiner

METHOD AND DEVICE FOR RECOVERING A SHARED MESH NETWORK

The present application is a continuation of PCT application PCT/CN2006/003503, filed on Dec. 20, 2006, entitled "A METHOD AND DEVICE FOR RECOVERING THE SHARE MESH NETWORK", which claims priority to Chinese Patent Application No. 200510132201.8, filed on Dec. 22, 2005, which are incorporated by reference herein in its entirety.

FIELD OF THE INVENTION

The present invention relates to the technical field of network communication, in particular, to a method and device for recovering a shared mesh network.

BACKGROUND OF THE INVENTION

Optical transmission networks, including Synchronous Digital Hierarchy (SDH), Synchronous Optical Network (SONET) and Optical Transport Network (OTN), are traditionally designed for transferring voice service. With the rapid development of data service, the proportion it occupies in the transmission traffic of an existing optical network becomes larger and larger, bandwidth demand on the transmission network becomes greater and greater, and the time for service provision is required to become shorter and shorter. As a result, existing network architecture and networking modes are impacted. To meet requirements of data service transmission, the network's topology needs to evolve from a traditional ring network to a mesh network in domination, and the provision mode of network connection service needs to transit from a permanent connection for static provision to a signaling-based soft permanent connection and switched connection in domination. Such a novel optical transmission network is referred to by the International Telecommunication Union—Standardization Sector (ITU-T) as Automatically Switched Optical Network (ASON). A control plane is introduced into the ASON for setting up, modifying and maintaining a network connection and recovering the connection in case of a network failure. One of signaling methods in the ASON is to employ Generalized Multi-Protocol Label Switching (GMPLS) developed by the Internet Engineering Task Force (IETF).

In a mesh network, to ensure that network connection service can be recovered in case of a network failure, a standby recovery path needs to be established for a working path of the connection. The following are strategies to establish a recovery path.

1) A recovery path is pre-established, in other words, a failure-independent recovery path is established in advance for a working path before a network failure occurs (when two paths are failure-independent, it means that these two paths will not be interrupted simultaneously due to the same network failure; failure-independency of two paths requires that the two paths should neither pass the same link nor pass the same Shared-Risk Link Group (SRLG)). An advantage of such a protection mode lies in that the time for recovering is short, usually less than 50 ms; however, its disadvantages are that the bandwidth occupation is high and the resource utilization is low.

2) A recovery path is computed in advance and network resources are reserved in a shared mode; after a network failure occurs, the recovery path is established dynamically. This protection mode is usually referred to as "shared mesh network recovery". Advantages of such a protection mode lie in that, resources can be reserved by reasonably planning a working path and a recovery path required by each network connection and the resource utilization can be improved by resource sharing of the recovery path. However, the time for recovering is longer than that in the recovery path pre-establishment mode, usually about 200 ms or longer.

3) A protection path is established on demand, in other words, a recovery path is computed again after a network failure occurs, and then the connection is tried to be recovered. An advantage of this protection mode lies in that any unpredictable network failures such as multiple network failures can be supported. Its disadvantages are that, the connection recovery cannot be guaranteed because no resource reservation is performed in advance, and its reliability is poor, and the time for recovering is much longer, usually several seconds.

Because the protection mode of shared mesh network recovery is both of high reliability of connection recovery and high resource utilization, it is regarded as a very effective method for service protection and recovery.

At present, a technical solution for recovering a shared mesh network is proposed in the field. In this technical solution, both a working path and a recovery path are established using a Resource ReSerVation Protocol-Traffic Engineering (RSVP-TE) protocol specified in RFC3743 specifications, a "PROTECTION" object is added by extending the protocol, and one bit in the object (referred to as "bit S" below) is used for indicating a recovery path of a shared mesh network. If the bit S is set as 1, the control plane only reserves resources but does not establish any cross connection. After the working path is interrupted due to a network failure, this bit is set as 0, and the control plane starts a cross connection and establishes a recovery path using the reserved resources; moreover, both the resource reservation and the cross connection establishment are realized through signaling interaction. Specifically, it includes the following processes.

1) A network ingress node of network connection service (referred to as "ingress node" for short) first determines source routing information of a working path and establishes the working path via a signaling protocol.

2) The ingress node determines source routing information of a recovery path, and "establishes" the recovery path via signaling. The difference from the establishment of the working path lies in that the bit S in the establishment signaling of the recovery path is set as 1, and each node on the recovery path only reserves link resources and does not establish any cross-connection. Therefore, the recovery path is not connected when the working path is in a normal state. During the whole life cycle of the network connection service, signaling sessions of the recovery path and signaling sessions of the working path both need to be maintained.

3) After the ingress node finds that the working path is interrupted due to a network failure, it sets the bit S in the signaling of the recovery path as 0. This modification is delivered station by station along the nodes on the recovery path via signaling message refresh. Each node that is passed establishes a cross connection of the recovery path using the reserved resources. The ingress node and an egress node further switch the network connection service from the working path to the recovery path for transmission.

During making the invention, the inventor finds the following issues.

The existing RSVP-TE protocol needs to be extended in the above technical solution, so it is complex to implement the solution.

In this technical solution, a signaling procedure needs to be started in advance when resource reservation is performed for the recovery path, and the signaling procedure continues from the beginning of the working path establishment to the ending of services on the working path. As a result, the load of the control plane in the signaling maintenance connection state is raised, the communication traffic of the data communication network is increased, and a lot of network resources are required to be consumed.

SUMMARY OF THE INVENTION

Embodiments of the present invention provide a method and device for recovering a shared mesh network. The technical solutions which are easy to implement may be realized using existing protocols and be well compatible with existing devices.

The embodiments of the invention are realized by the following technical solutions.

One embodiment of the invention provides a method for recovering a shared mesh network, which comprises the following processes: determining and saving routing information of a recovery path by the network ingress node of network connection service; controlling resource reservation of the recovery path by a network management system after the working path is established successfully; initiating an establishing procedure of the recovery path by a network ingress node of the network connection service by using the reserved resources according to the saved routing information of the recovery path, after the working path is interrupted; and switching services on the working path to the recovery path for transmission.

Another embodiment of the invention provides a device for recovering a shared mesh network, which comprises: a routing information saving module for determining and saving routing information of a recovery path; a resource reservation controlling module for controlling resource reservation for the recovery path according to the routing information of the recovery path saved by the routing information saving module; a path establishing module for establishing the recovery path according to the routing information of the recovery path saved by the routing information saving module and resources reserved for the recovery path by the resource reservation controlling module; and a path switching module for switching services on a working path where a failure occurs to the recovery path corresponding to the working path established by the path establishing module.

It can be seen from the technical solutions provided by the above embodiments of the invention that, the solutions according to the embodiments of the invention have the following advantages.

Shared mesh network recovery may be realized by using existing protocols, such as RSVP-TE and so on, without extending the protocols. Therefore, these technical solutions are easy to implement and may be well compatible with existing devices.

No signaling flow needs to be started during the resource reservation of the recovery path. Instead, a signaling flow is started on demand after the working path is interrupted due to a network failure. As a result, the load of the control plane in the signaling maintenance connection state is reduced, the communication traffic of the data communication network is lowered, and network resources are saved.

Moreover, in the technical solutions of the invention, the network management system collectively maintains the relationship between the resources of the recovery path and the recovery path and network connection service, and the control plane only needs to maintain the number of the resources that are "reserved for use by the recovery path". Therefore, the realization of the control plane may be simplified.

DETAILED DESCRIPTION OF THE EMBODIMENTS

According to one embodiment of the invention, in an ASON network, a network ingress node of network connection service determines and saves routing information of a recovery path; after a working path is established successfully, a network management system controls resource reservation of the recovery path; and after the working path is interrupted, the network ingress node of the network connection service initiates an establishing procedure of the recovery path using reserved resources according to the saved routing information of the recovery path, and switches services on the working path to the recovery path for transmission.

For further understanding embodiments of the invention, the embodiments of the invention will now be illustrated in detail in conjunction with the accompanying drawings, but they are not intended to limit the scope of the invention.

Figure 1:
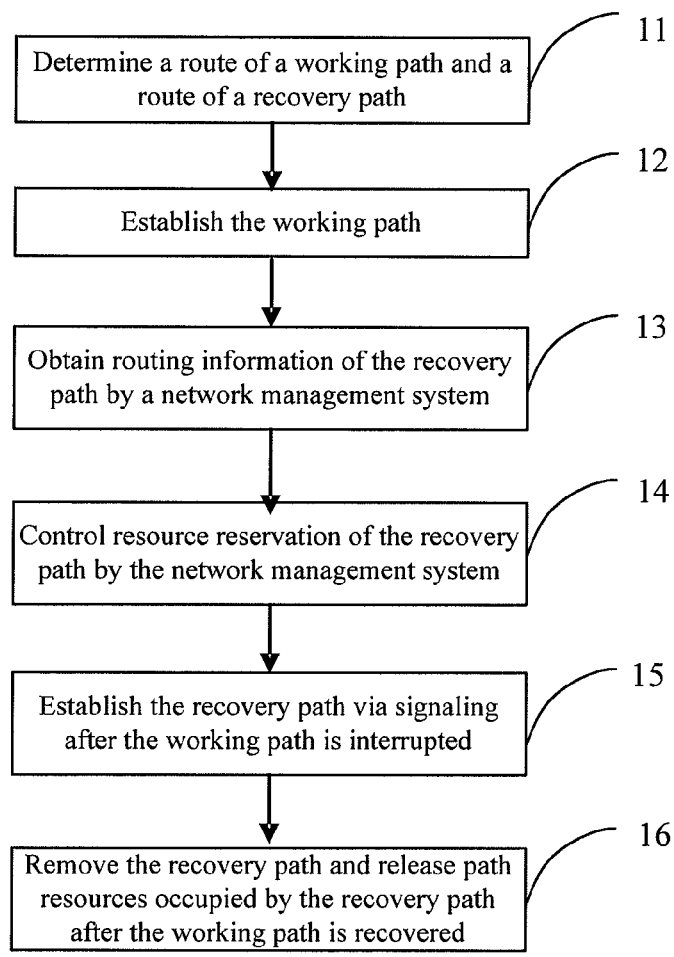
FIG. 1 is a processing flow chart of a method according to one embodiment of the invention.

One specific embodiment of the invention is shown in FIG. 1. FIG. 1 is a processing flow chart of a method according to one embodiment of the invention, which includes the following processes.

Block 11: determining a route of a working path and a route of a recovery path.

In an ASON network, a network management system sends a connection establishment request to a network ingress node of network connection service (referred to as "ingress node" for short hereinafter).

After the ingress node receives this connection establishment request message, it parses the request; and if the request message carries routing information of a working path and a recovery path having strict explicit routes, it takes this routing information as routing information of the working path and the recovery path, and saves the routing information of the recovery path.

If no routing information of a working path and/or a recovery path is carried in the connection establishment request message or routing information that is carried is loose explicit routing information, the ingress node computes the route of the working path and/or the route of the recovery path and saves routing information of the recovery path.

The strict explicit routing information includes a sequence of links that the path passes successively, and a link is usually consisted of a node ID and a port ID, both of which are collectively referred to as link ID.

The loose explicit routing information refers to routing information lacking part or all of the links that are passed.

Block 12: establishing the working path.

After the ingress node determines the route of the working path and the route of the recovery path, it initiates an establishing procedure of the working path.

The working path may be established in this manner as follows.

The ingress node successively sends a connection establishment request for the working path to each node till reaching the last node on the working path (referred to as "egress node" for short hereinafter) via a datagram of a GMPLS-extended signaling protocol (such as RSVP-TE protocol, etc.); during this procedure, each node performs resource reservation after it receives the connection establishment request.

After resource reservation is performed for the working path, each node on the working path, starting from the egress node and to the ingress node, successively establishes a corresponding cross connection in a direction opposite to the connection establishment request for the working path, and returns a connection establishment response to a previous node after the cross connection is established.

After the working path is established successfully, the ingress node returns a message "Working Path Connection Establishment Successful" to the network management system.

Block 13: obtaining the routing information of the recovery path by the network management system after receiving the message "Working Path Connection Establishment Successful".

If the connection establishment request message delivered by the network management system to the ingress node carries routing information of the recovery path having strict explicit routes, the network management system takes this routing information of the recovery path carried in the request message as the routing information of the recovery path.

If the connection establishment request message delivered by the network management system to the ingress node carries no routing information of the recovery path or routing information that is carried is loose explicit routing information, the network management system needs to query and obtain the routing information of the recovery path from the ingress node.

Block 14: controlling resource reservation of the recovery path by the network management system.

The network management system determines a link that the recovery path passes according to the obtained routing information of the recovery path, determines whether reserved resources need to be allocated to the corresponding link, and controls resource reservation according to this determination result.

When no reserved resource exists on a certain link of the recovery path, the network management system determines that the reserved resources need to be allocated to this link.

When one or more reserved resources exist on a certain link of the recovery path, and the recovery path may share one or more of the reserved resources, i.e., other working paths protected by these reserved resources are failure-independent of the working path of the present connection request, the network management system determines that no reserved resource needs to be allocated on the link for establishing the recovery path;

When one or more reserved resources already exist on a certain link of the recovery path, and the recovery path cannot share any of the reserved resources, i.e., other working paths protected by these reserved resources are failure-relevant to the working path of the present connection request, the network management system determines that the reserved resources need to be allocated on the link for establishing the recovery path.

Figure 2:
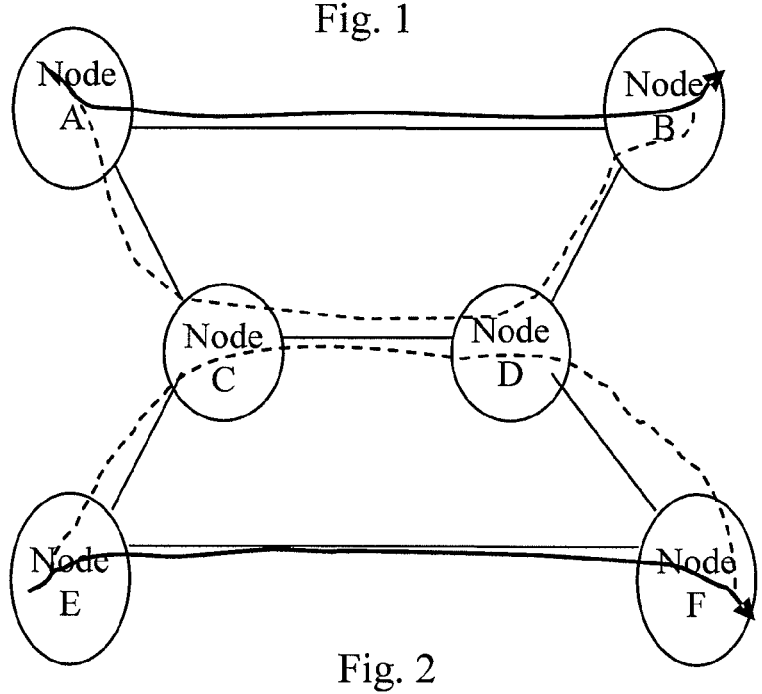
FIG. 2 is a structural schematic diagram of a shared mesh network according to one embodiment of the invention.

FIG. 2 is a structural schematic diagram of a shared mesh network according to one embodiment of the invention. In the network shown in FIG. 2, there are totally six nodes A-F, seven link connections A-B, A-C, C-D, D-B, E-C, D-F and E-F, and two working paths AB and EF.

The working path AB passes the link A-B, and its recovery path passes the links A-C, C-D and D-B; while the working path EF passes the link E-F, and its recovery path passes the links E-C, C-D and D-F.

Because the working path AB and the working path EF do not pass the same link or SRLG, these two working paths are failure-independent, and thus their recovery paths may share recovery resources on the link C-D.

During the process in which the network management system reserves resources for the recovery path of the working path AB, if reserved resources allocated for the recovery path of the working path EF already exist on the link C-D, the network management system does not need to allocate the reserved resources for the recovery path of the working path AB.

When it is determined that the reserved resources need to be allocated for establishing a certain link of the recovery path, the network management system sends a resource reservation command to two end nodes of this corresponding link. After the nodes of the corresponding link receive the resource reservation command, they reserve corresponding resources. These resources can only be used for the recovery path of this associated connection, rather than the working path of a newly-established connection.

The specific procedure of resource reservation may be performed according to any technical solutions regarding resource reservation in a draft supporting end-to-end recovery in accordance with the extended RSVP-TE protocol (draft-ieff-ccamp-gmpls-recovery-e2e-signaling).

Block 15: initiating an establishing procedure of the recovery path via a signaling by the ingress node after determining that a failure occurs on the working path.

When the working path is interrupted due to a network failure, the ingress node of the working path may determine a working path failure via alarm detection or failure notification of a control plane so that it may initiate an establishing procedure of the recovery path according to the saved routing information of the recovery path.

The signaling procedure for establishing the recovery path is similar to that for establishing the working path, and link resources reserved in advance are used for establishing the recovery path. The recovery path may be established in this manner as follows.

The ingress node sends a connection establishment request for the recovery path to each node successively via a datagram of a GMPLS extended signaling protocol (such as RSVP-TE protocol, etc.) according to the routing information of the recovery path, till reaching the egress node of the recovery path; during this procedure, each node confirms the reserved resources.

Then, each node on the recovery path, starting from the egress node and to the ingress node, successively establishes a corresponding cross connection in a direction opposite to the connection establishment request for the recovery path, and returns a connection establishment response to a previous node after the cross connection is established.

Finally, after the recovery path is established successfully, the ingress node returns a message "Recovery Path Connection Establishment Successful" to the network management system.

After the recovery path is established successfully, signals from a user need to be transferred to the recovery path for transmission, so that services may be recovered.

Specifically, there are several specific modes to transfer signals from a user to the recovery path.

One mode is that, the user's signals may be bridged to the working path and the recovery path at the source end; and signals are received from the recovery path at the destination end.

An advantage of this mode lies in that, the state of the working path may be monitored at any moment, and after the working path is recovered, services may be switched to the working path in time.

Another mode is that, a cross connection between the user's signals and the working path is removed and the user's signals are switched to the recovery path for transmission.

Block 16: removing the recovery path and releasing the resources after the working path is recovered.

If the network failure is fixed, after the working path is recovered, the user's signals need to be switched back to the working path for transmission, and then the recovery path is removed and those resources occupied by the recovery path are released. These resources may be used for establishing other working paths or recovery paths.

The above technical solution is directed to Soft Permanent Connection (SPC), and it may also be applied to Switched Connection (SC).

For a switched connection, the connection establishment request received by the ingress node comes from a user equipment (such as a router or an switch, etc.) or its agent.

During the above procedure in which the network management system performs resource reservation of the recovery path, if the reserved resources need to be allocated for establishing the recovery path, the network management system may send a resource reservation command to two end nodes of a corresponding link and resource reservation is performed by these corresponding nodes; or alternatively, the network management system may perform resource reservation by itself and collectively save reserved resource reservation.

These resources needed to establish a link in the network usually have three states, which respectively are:

Occupied State, which means that the resources are used by a path that is already established;

Reserved State, which means that the resources in this state can only be used for establishing a recovery path for shared mesh network recovery and cannot be used for establishing other paths such as a working path; and Idle State, which means that the resources in this state may be used for establishing various paths without any limitation.

Therefore, in case of the resource reservation mode in which the network management system collectively performs resource reservation and saves reserved reservation information of the recovery path, to ensure that the resources reserved for the recovery path will not be occupied by other connections, nodes in the network shall query resource reservation situations from the network management system periodically or on demand; for example, a node in the network may query resource reservation situations from the network management system after it receives a new connection establishment request, and it can establish a new working path using only those resources in an idle state.

The node may query resource reservation situations from the network management system via directory service. At this point, the network management system may act as a directory server in which resource reservation situations of each node are saved under directories. The node may query corresponding resource reservation situations from the network management system via a directory service protocol.

Furthermore, no matter what resource reservation mode is employed, resources used for establishing the recovery path may be either the reserved resources or resources in an idle state.

The network management system according to the embodiments of the invention is usually a system composed of one or more software communicating with each other that may support a network operator to manage and operate an optical transmission network. The system supports various management functions of the network and nodes (such as a function of initiating a soft permanent connection) via management interfaces provided by the network nodes. These management functions include a network resource management function responsible for tracking usage conditions of network link resources, not only including usage conditions of link resources used by the working path, but also including resource reservation situations of the recovery path. Specifically, the resource management function may be embedded inside network management software, or it may also serve as independent software in communication with the network management software so that it forms a part of the network management system.

The ASON network according to the embodiments of the invention includes SDH, SONET, OTN or Optical Cross-connect (OXC), etc.

Figure 3:
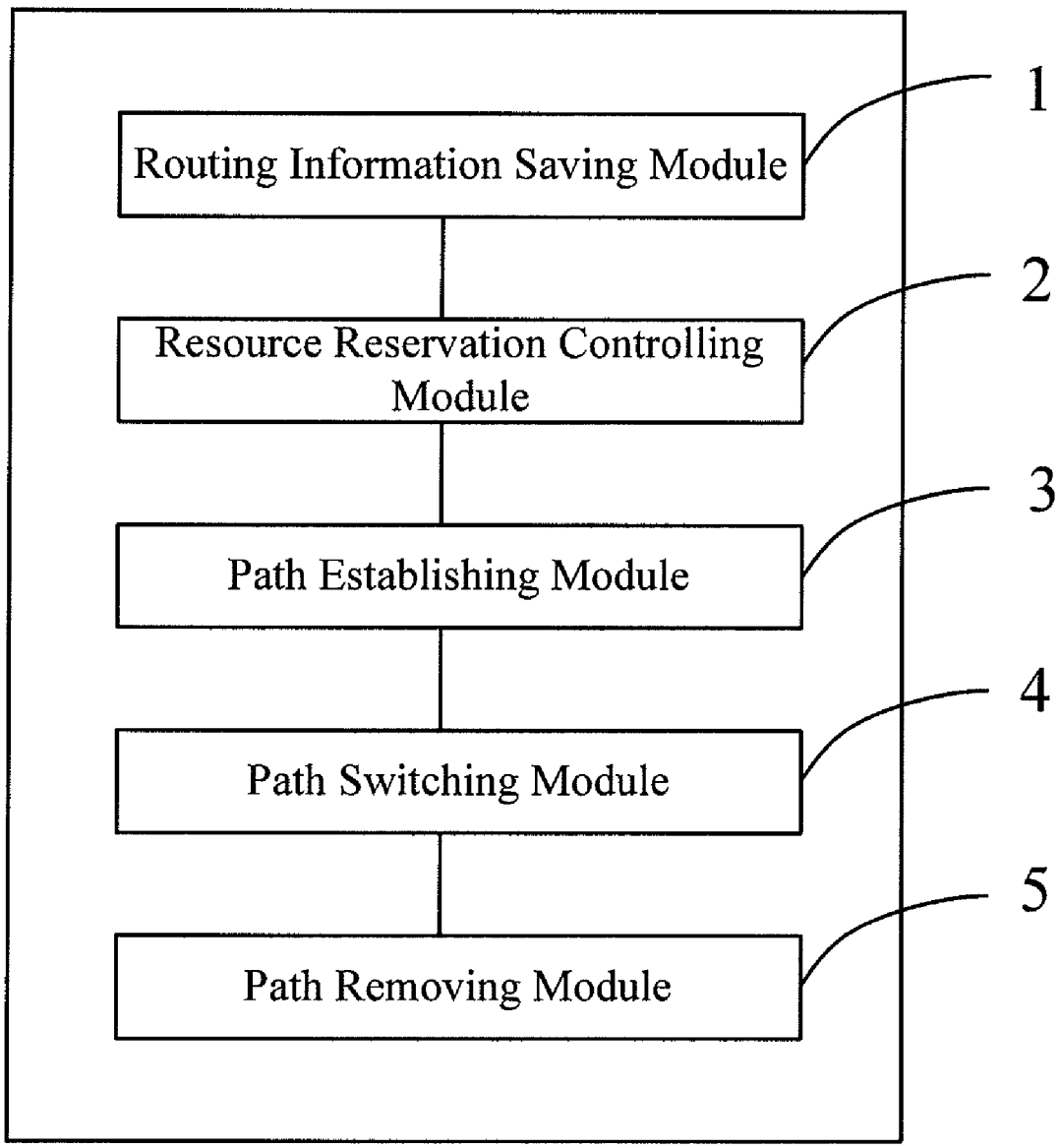
FIG. 3 is a schematic diagram of modules in a device according to one embodiment of the invention.

One embodiment of the invention provides a device for recovering a shared mesh network. FIG. 3 shows a schematic diagram of modules in an embodiment of the device. The device includes: a routing information saving module 1 for determining and saving routing information of a recovery path; a resource reservation controlling module 2 for controlling resources reserved for the recovery path according to the routing information of the recovery path saved by the routing information saving module 1; a path establishing module 3 for establishing the recovery path according to the routing information of the recovery path saved by the routing information saving module 1 and the resources reserved for the recovery path by the resource reservation controlling module 2; a path switching module 4 for switching services on a working path where a failure occurs to the recovery path corresponding to the working path established by the path establishing module 3; and a path removing module 5 for removing the recovery path and releasing path resources occupied by the recovery path.

In summary, the technical solutions according to the embodiments of the invention may use existing protocols, such as RSVP-TE protocol, to achieve shared mesh network recovery without extending the protocols. Therefore, these technical solutions are easy to implement, and may be well compatible with existing devices. Moreover, no signaling flow needs to be started during resource reservation of the recovery path; instead, a signaling flow is started as required after the working path is interrupted due to a network failure. As a result, the load of the control plane in the signaling maintenance connection state is reduced, communication traffic of the data communication network is lowered, and network resources can be saved.

The above is only used to illustrate the specific embodiments of the invention but not to limit the scope of the invention. Various modifications and variations which readily occur to those skilled in the art without departing from the spirit and scope of the invention are intended to fall within the scope of the invention. Therefore, the scope of the present invention shall be defined by the claims and the equivalents thereof.

The invention claimed is:

1. A method for recovering a shared mesh network, comprising:
   a network management system sending a connection establishment request message to a network ingress node of a network connection server;

parsing the connection establishment request message received by the network ingress node;

if the request message carries routing information of a working path and a recovery path having strict explicit routes, taking, by the network ingress node, the routing information carried in the request message as the routing information of the working path and the recovery path, and saving the routing information of the recovery path carried in the request message;

if the request message carries no routing information of a working path and/or a recovery path, computing, by the network ingress node, a route of the working path and/or a route of the recovery path, and saving, by the network ingress node, the computed routing information of the recovery path;

after the working path is successfully established, returning, by the network ingress node, a message "working path connection establishment successful" to the network management system;

obtaining, by the network management system, the routing information of the recovery path after receiving the message "Working Path Establishment Successful" sent by the network ingress node;

determining, by the network management system, a link that the recovery path passes according to the obtained routing information of the recovery path and determining whether resources need to be reserved for the link;

controlling resource reservation of the recovery path by the network management system according to this determination result;

initiating an establishing procedure of the recovery path by the network ingress node of the network connection service by using reserved resources according to the saved routing information of the recovery path, after the working path is interrupted; and switching services on the working path to the recovery path for transmission.

2. The method according to claim 1, further comprising:

if the routing information carried in the request message is loose explicit routing information, computing, by the network ingress node, a route of the working path and/or a route of the recovery path and saving the routing information of the recovery path that is carried in the request message; and initiating an establishing procedure of the working path by the network ingress node of the network connection server according to the determined routing information of the working path.

3. The method according to claim 2, wherein:

when the connection is a soft permanent connection, the connection establishment request comes from the network management system;

when the connection is a switched connection, the connection establishment request comes from a user equipment or its agent.

4. The method according to claim 2, wherein the method further comprises:

initiating, by the network ingress node, an establishing procedure of the recovery path by using resources in an idle state according to the saved routing information of the recovery path, and switching services on the working path to the recovery path for transmission, after the working path is interrupted.

5. The method according to claim 1, wherein the step in which the network management system obtains the routing information of the recovery path comprises:

when the connection establishment request comes from the network management system and the request message carries routing information of a recovery path having strict explicit routes, the network management system takes the routing information carried in the request message as the routing information of the recovery path; or when the connection establishment request comes from the network management system, and the request message carries no routing information of a recovery path or routing information of a recovery path carried in the request message is loose explicit routing information, the network management system queries and obtains the routing information of the recovery path from the network ingress node; or when the connection establishment request comes from a user equipment or its agent, the network management system queries and obtains the routing information of the recovery path from the network ingress node of the network connection server.

6. The method according to claim 1, wherein the process of determining by the network management system the link that the recovery path passes and determining whether resources need to be reserved for the link comprises:

determining by the network management system that no reserved resource needs to be allocated to the link, when available shared reserved resources exist on the link that the recovery path passes; and determining by the network management system that reserved resources need to be allocated to the link, when no reserved resource exists on the link that the recovery path passes or no available shared reserved resource exists.

7. The method according to claim 1, wherein the process of controlling the resource reservation by the network management system according to the determination result further comprises:

sending a resource reservation command by the network management system to two end nodes of the link that the recovery path passes after determining that reserved resources need to be allocated to the link; and performing resource reservation by the two end nodes after receiving the resource reservation command.

8. The method according to claim 1, wherein the process of controlling resource reservation by the network management system according to the determination result further comprises performing resource reservation and saving reserved resource information by the network management system when determining that reserved resources need to be allocated to the link that the recovery path passes.

9. The method according to claim 8, wherein the method further comprises:

querying, by a node in the network, the reserved resource reservation information from the network management system and establishing a new working path by using resources in an idle state after the node receives a new connection establishment request.

10. The method according to claim 1, wherein the method further comprises:

initiating, by the network ingress node, an establishing procedure of the recovery path by using resources in an idle state according to the saved routing information of the recovery path, and switching services on the working path to the recovery path for transmission, after the working path is interrupted.

11. The method according to claim 1, wherein the process of switching services on the working path to the recovery path comprises:

bridging a user's signals to the working path and the recovery path, and receiving signals from the recovery path.

12. The method according to claim 1, wherein the process of switching services on the working path to the recovery path comprises:

removing a cross connection between the user's signals and the working path, and switching the user's signals to the recovery path for transmission.

13. The method according to claim 1, wherein the method further comprises:

removing the recovery path and releasing those resources occupied by the recovery path, after the working path is recovered.

* * * * *